(12) United States Patent
Erickson et al.

(10) Patent No.: US 7,987,064 B2
(45) Date of Patent: Jul. 26, 2011

(54) DYNAMIC DETERMINATION OF A MINIMAL CONFIGURED PRODUCT TO ACHIEVE DESIRED TEST COVERAGE

(75) Inventors: Steven C. Erickson, Rochester, MN (US); Fraser A. Syme, Rochester, MN (US); William Robert Taylor, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/184,670

(22) Filed: Aug. 1, 2008

(65) Prior Publication Data
US 2010/0030507 A1 Feb. 4, 2010

(51) Int. Cl.
G06F 19/00 (2006.01)
G06F 15/177 (2006.01)
(52) U.S. Cl. .......................................... 702/108; 713/1
(58) Field of Classification Search .................. 702/108; 705/14.19, 28; 713/1, 2
See application file for complete search history.

(56) References Cited

U.S. PATENT DOCUMENTS

| 7,360,071 B2 | 4/2008 | Ewing et al. |
| 2008/0056228 A1* | 3/2008 | Knipfer et al. ................ 370/349 |

* cited by examiner

*Primary Examiner* — Bryan Bui
(74) *Attorney, Agent, or Firm* — Suiter Swantz pc llo

(57) ABSTRACT

The present disclosure is directed to a method for determining dynamic test coverage for a product. The method may comprise: receiving a customer order, the customer order comprising at least one product configuration; receiving a rule set associated with the at least one product configuration; analyzing the rule set to determine a proxy part to add to the at least one product configuration; providing the proxy part an indicator; adding the proxy part to the at least one product configuration; iteratively comparing the product configuration to the rule set until the product configuration meets the rule set; providing a test associated with the at least one product configuration; receiving at least one signal from at least one indicator; and removing at least one proxy part from the at least one product configuration.

1 Claim, 8 Drawing Sheets

BOM Alias and Requirements Tables

| BOM Alias Table | |
|---|---|
| Bill Of Material | BOM Alias |
| 000X1111 | BladeChassis |
| 000X1112 | SAS Backplane |
| 000X1113 | DASD |
| 000X1114 | SAS_Switch |
| 000X1115 | FiberChannelSwitch |
| 000X1116 | CopperEthernetSwitch |
| 001X1111 | Blade |
| 001X1111a | BladeProxy1 |
| 001X1111b | BladeProxy2 |
| 001X1112 | BladeFCAdapter |
| 001X1113 | BladeDasd300GB |
| 001X1114 | DDR2Memory32GB |
| 001X1115 | BladeDasd73GB |
| 001X1116 | BladeSAS_Adapter |
| 001X1117 | DDR3Memory32GB |

| BOM Requirements/Proxy Table | | | |
|---|---|---|---|
| Bill Of Material | BOM Rqd Alias | BOM Rqd Qty | Proxy BOM |
| 000X1114 | BladeSAS_Adapter | 1 | 001X1111a |
| 000X1115 | BladeFCAdapter | 1 | 001X1111b |
| 001X1111a | BladeDasd73GB | 1 | 001X1113 |
| 001X1111a | DDR2Memory32GB | 2 | 001X1114 |
| 001X1111b | BladeDasd300GB | 1 | 001X1113 |
| 001X1111b | DDR3Memory32GB | 4 | 001X1114 |

FIG. 7

| BOM | Desc | Qty | 1st Pass | | 2nd Pass | | 3rd Pass | | 4th Pass | |
|---|---|---|---|---|---|---|---|---|---|---|
| | | | Rqd BOM | Proxy Part | Parent BOM | Proxy Part | Parent BOM | Proxy Part | Parent BOM | Proxy Part |
| 000X1111 | Blade Chassis | 1 | N/A | | N/A | | N/A | | N/A | |
| 000X1112 | SAS Backplane | 2 | N/A | | N/A | | N/A | | N/A | |
| 000X1113 | DASD | 12 | N/A | | N/A | | N/A | | N/A | |
| 000X1114 | SAS Switch | 1 | None Found | 001X1116 | 001X1112 | | 001X1112 | | 001X1112 | |
| 000X1115 | FC Switch | 1 | None Found | 001X1112 | 001X1116 | | 001X1116 | | 001X1116 | |
| 000X1116 | Copper Ethernet Switch | 1 | N/A | | N/A | | N/A | | N/A | |
| 001X1112 | Blade FC Adapter | 1 | | | None Found | 001X1111b | 001X1111b | | 001X1111b | |
| 001X1116 | Blade SAS Adapter | 1 | | | None Found | 001X1111a | 001X1111a | | 001X1111a | |
| 001X1111a | BladeProxy1 | 1 | | | | | None Found | 001X1114 x2 001X1115 x1 | 001X1114 x2 001X1115 x1 | |
| 001X1111b | BladeProxy2 | 1 | | | | | None Found | 001X1117 x4 001X1113 x1 | 001X1117 x4 001X1113 x1 | |
| 001X1113 | BladeDASD 300GB | 1 | | | | | | | N/A | |
| 001X1114 | BladeDDR2 Memory 32GB | 2 | | | | | | | N/A | |
| 001X1115 | BladeDASD 73GB | 1 | | | | | | | N/A | |
| 001X1117 | DDR3 Memory | 4 | | | | | | | | |

FIG. 8

DYNAMIC DETERMINATION OF A MINIMAL CONFIGURED PRODUCT TO ACHIEVE DESIRED TEST COVERAGE

TECHNICAL FIELD

The present disclosure generally relates to the field of product manufacturing, and more particularly to a method for manufacturing a product including at least two proxy parts for facilitating product testing.

BACKGROUND

It is a common industry practice in the manufacturing of complex built-to-order products to add additional components (beyond those specified by the customer) in order to make the product minimally functional and testable. These additional components may be referred to as proxy, slave, captive, or golden parts. In some cases components are added to verify functions that the customer may enable later by purchasing added product capabilities at a later date. In any case, these "extra" components required for product test are removed before preparing the product for shipment.

The additional parts added for test can be either managed locally by the test process (most common industry practice) or could be managed by the manufacturing logistics systems in a more tightly controlled fashion. The problem is that in some cases, the product complexity and variability overwhelms the simple logic that is common today with either approach.

Existing solutions include stocking various complex assemblies in the test area or relying on highly-skilled operators to determine what is needed to prepare the customer order for a full test. These approaches are not sufficient for these reasons:
   a. Requires financial investment (expense/capital) for inventory to be used as proxy parts.
   b. Requires processes for the manufacturing line to manage the quality of the proxy inventory.
   c. Requires order scheduling team to understand capacity implications for orders that require these parts. Typically this is really not handled and orders can be stuck in test waiting for test parts.
   d. Requires skilled manufacturing operators to identify proxy part requirements and then configure these proxy products to match the customer's solution that requires validation.
   e. Stops the production process to recognize, find, and install required hardware. This adds cycle time and drives direct labor costs higher.
   f. Limits applicability because it only works if proxy products have limited configuration variations at a product level.
   g. Only works in low volume situations.

SUMMARY

The present disclosure is directed to a method for determining dynamic test coverage for a product. The method may comprise: receiving a customer order, the customer order comprising at least one product configuration; receiving a rule set associated with the at least one product configuration; analyzing the rule set to determine a proxy part to add to the at least one product configuration; providing the proxy part an indicator, wherein the indicator transmits a signal to indicate the proxy part should be removed from the at least one product configuration; adding the proxy part to the at least one product configuration; iteratively comparing the product configuration to the rule set until the product configuration meets the rule set; providing a test associated with the at least one product configuration; receiving at least one signal from at least one indicator; and removing at least one proxy part from the at least one product configuration.

The present disclosure may allow one skilled in the art to realize certain advantages to implementing the method for determining dynamic test coverage for a product:
   a. May eliminate capital inventory cost and expense for test equipment maintenance through the use of production parts.
   b. May allow for automatic verification that parts are available as orders are released (versus waiting for the test process to realize that they are short of certain golden parts)
   c. May allow for automated configuration determination, thus eliminating the needs for highly product knowledgeable test operator for proxy build identification and/or build.
   d. May reduce test cycle time and additional test coverage/quality.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 7 is an illustration of the Bill of Materials alias and requirements table; and FIG. 8 is an alternate illustration of the Bill of Materials alias and requirements table.

DETAILED DESCRIPTION

Reference will now be made in detail to the subject matter disclosed, which is illustrated in the accompanying drawings.

The present disclosure is directed to a method for determining dynamic test coverage for a product. The method may comprise: receiving a customer order, the customer order comprising at least one product configuration; receiving a rule set associated with the at least one product configuration; analyzing the rule set to determine a proxy part to add to the at least one product configuration; providing the proxy part an indicator, wherein the indicator transmits a signal to indicate the proxy part should be removed from the at least one product configuration; adding the proxy part to the at least one product configuration; iteratively comparing the product configuration to the rule set until the product configuration meets the rule set; providing a test associated with the at least one product configuration; receiving at least one signal from at least one indicator; and removing at least one proxy part from the at least one product configuration.

A method for determining dynamic test coverage may comprise these high-level design characteristics:
  a. May allow for complex assemblies to be dynamically configured and added to the customer order while also supporting the addition of single proxy parts as well.
  b. May use a recursive design in order to adjust the configuration as rules are satisfied and only completing once a complete and valid configuration is achieved.
  c. May allow for rules to be defined up front in order to drive the requirements so that as test requirements change based upon process and quality data, only simple table changes may be required.
  d. The design may include the definition of the relationships between an existing Bill of Materials (BOM) or PN and the requirements for another BOM/PN (or set of BOM/PNs) that must be satisfied by the order.

Figure 1:
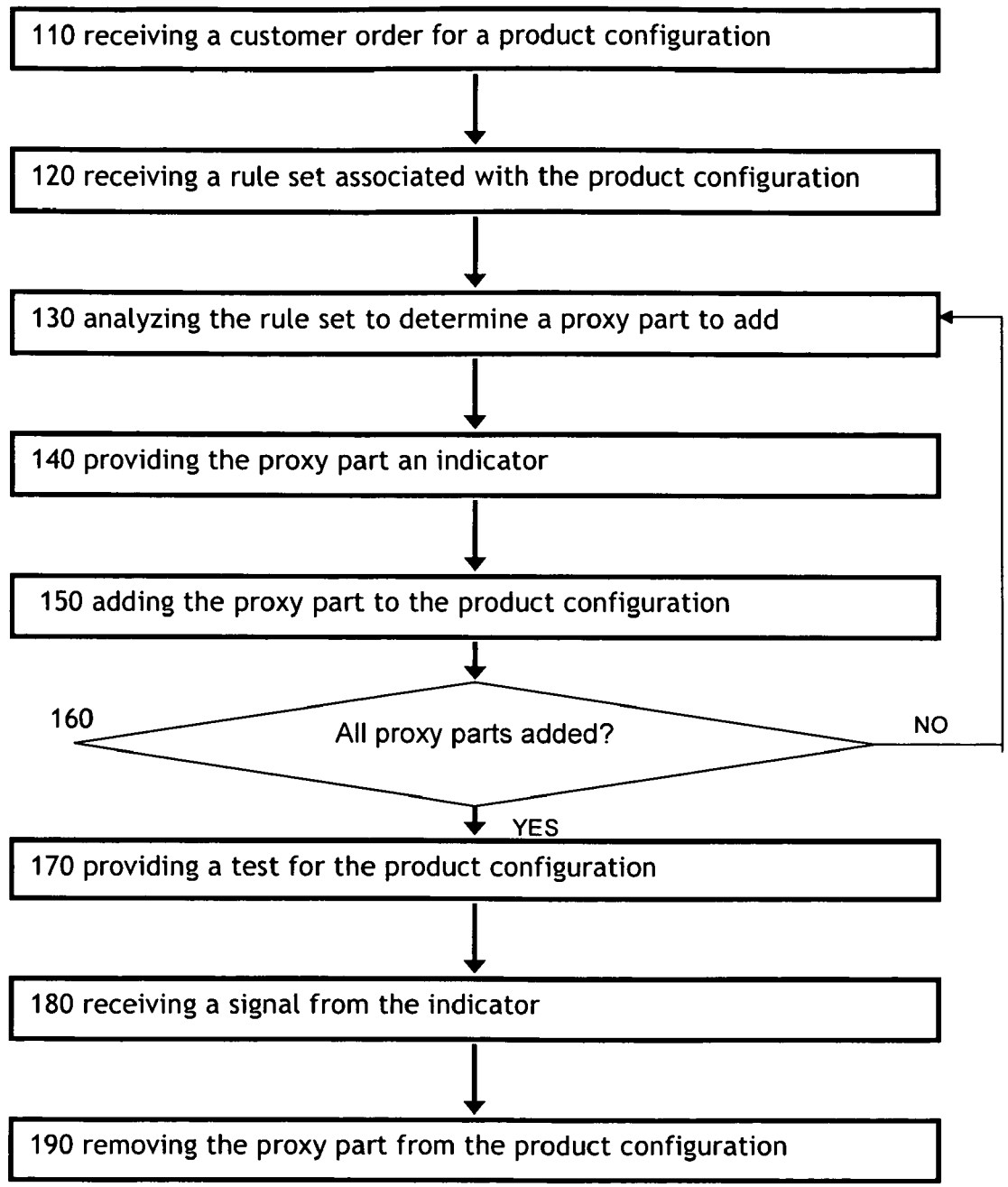
FIG. 1 is a flow diagram illustrating a method for determining dynamic test coverage for a product.
Figure 2:
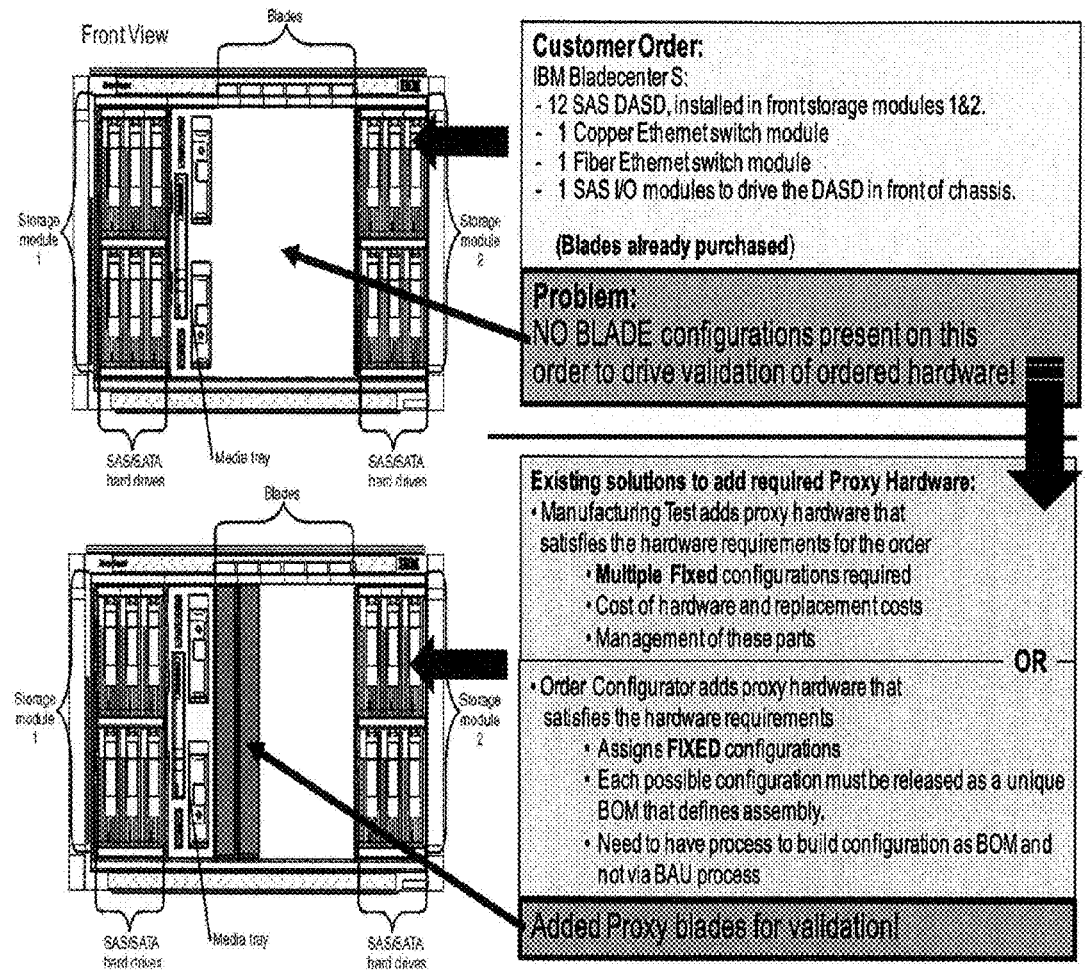
FIG. 2 is a front view of IBM's Bladecenter technology illustrating a Blade configuration without proxy parts and a Blade configuration with proxy parts.
Figure 3:
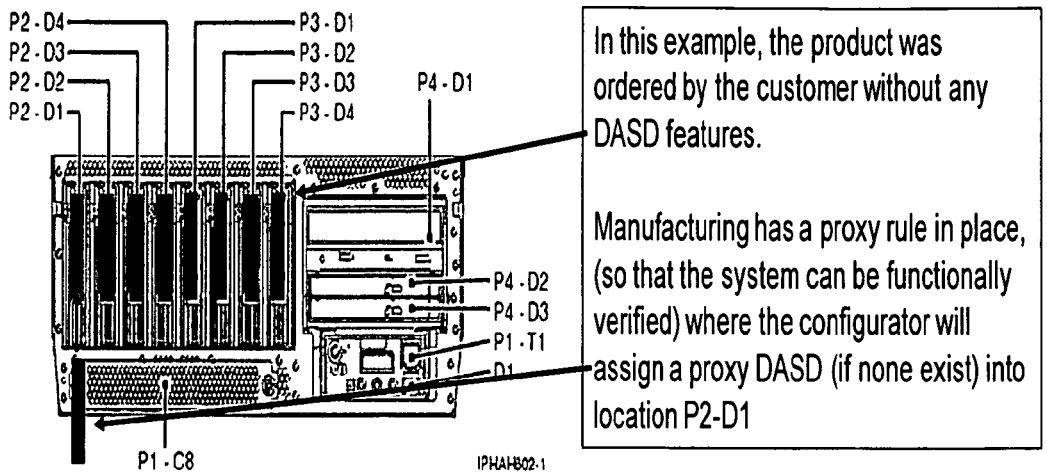
FIG. 3 is a side view of a product once the proxy parts have been implemented into the product.
Figure 4:
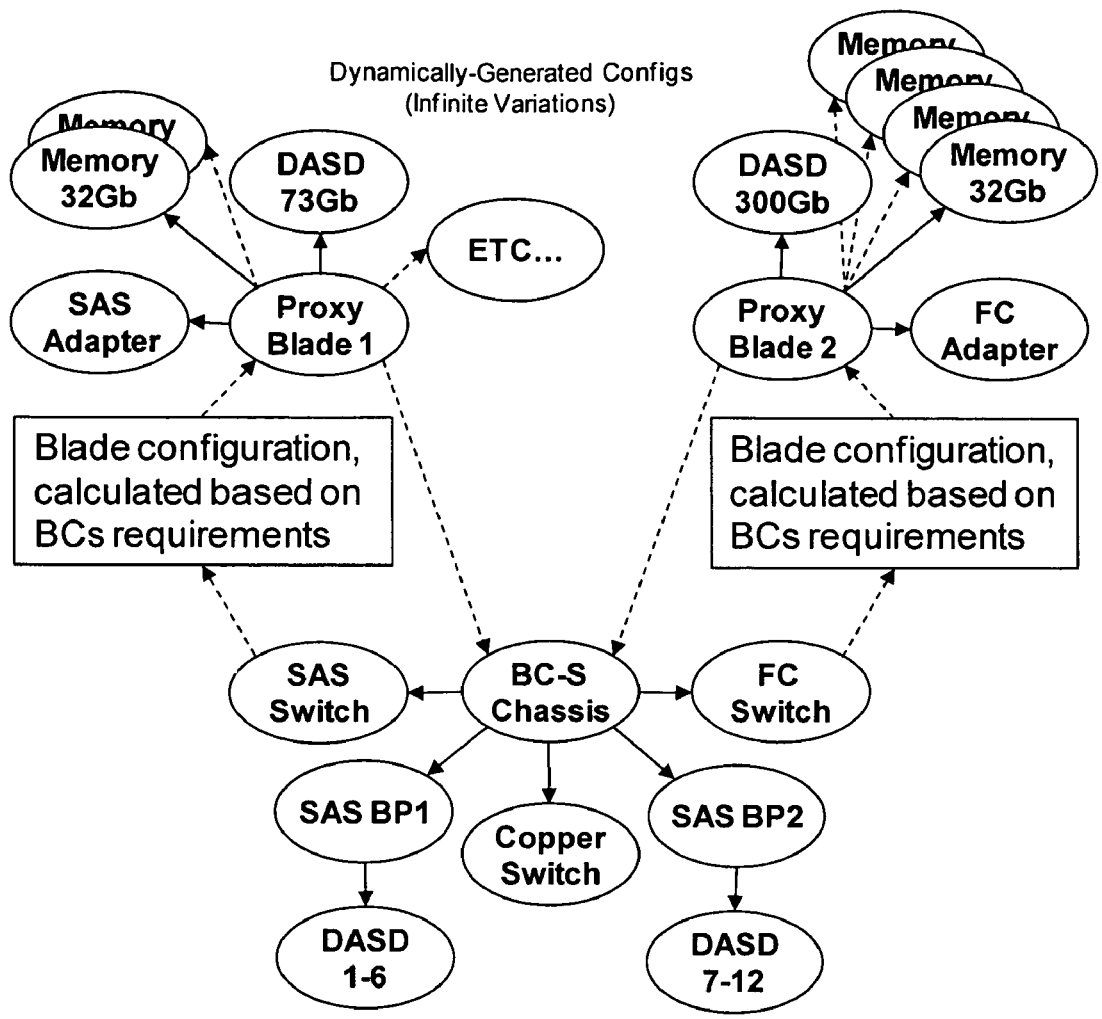
FIG. 4 is a tree diagram illustrating the present disclosure.
Figure 5:
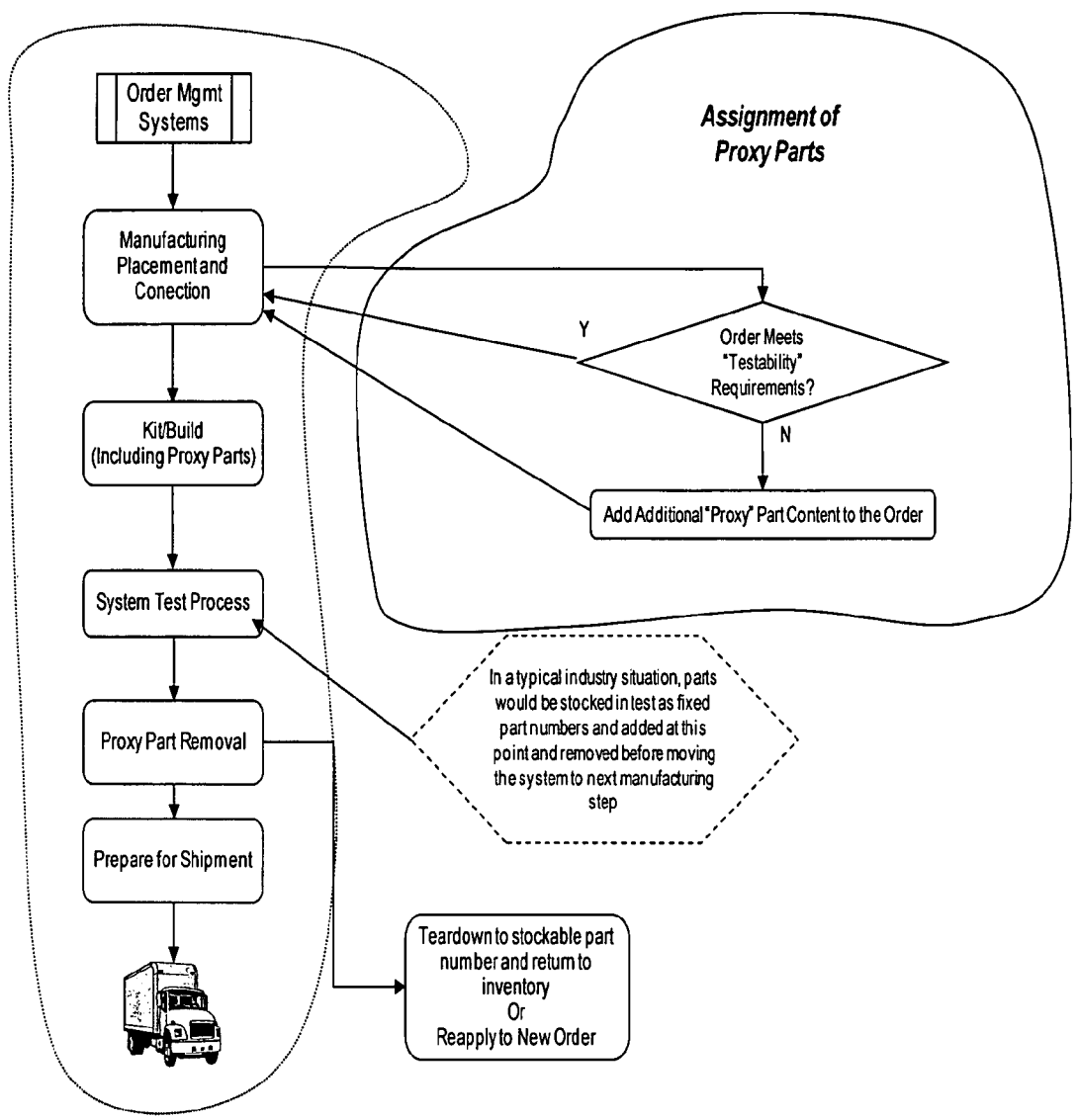
FIG. 5 is an alternate flow diagram illustrating a method for determining dynamic test coverage for a product.
Figure 6:
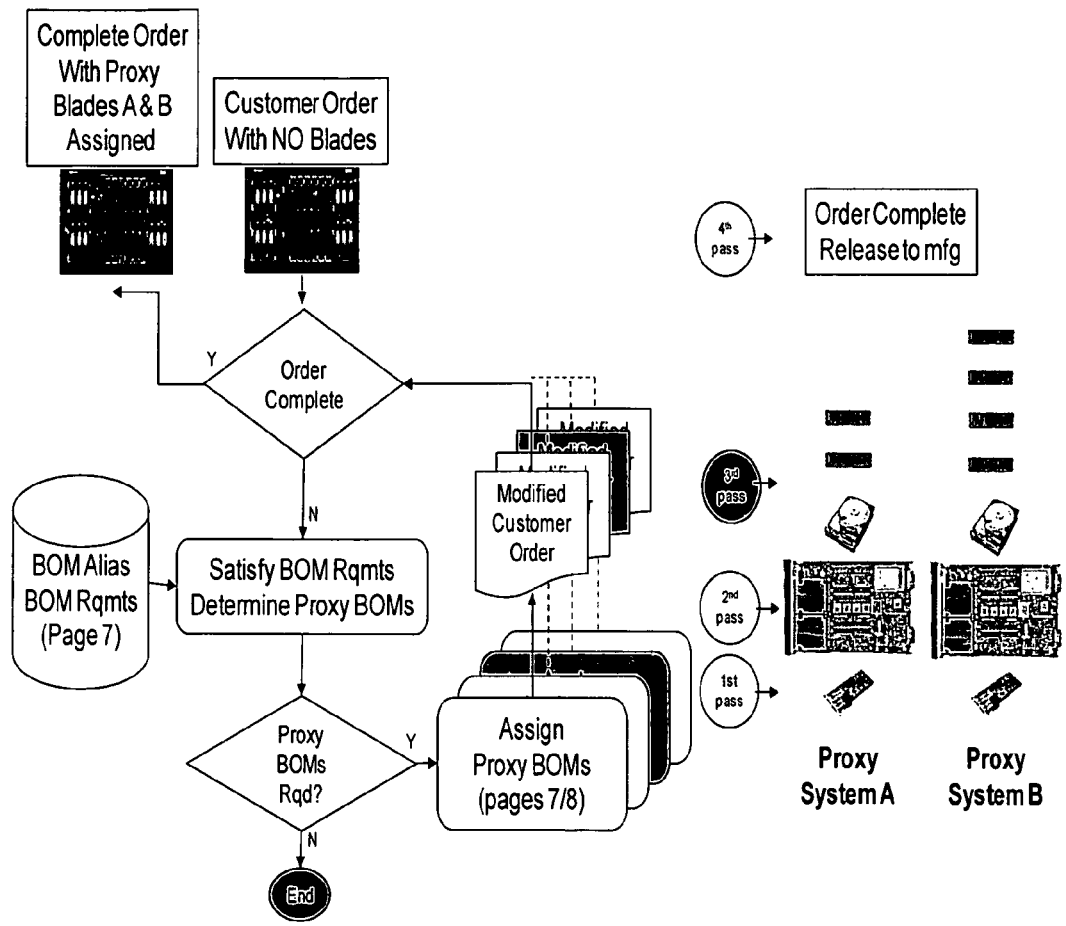
FIG. 6 is an alternate flow diagram illustrating a method for determining dynamic test coverage for a product.

Referring now to FIG. 1, a method 100 for determining proper test coverage for a product is described. The method 100 may receive a customer order, the customer order comprising at least one product configuration 110. The method 100 may receive a rule set associated with the at least one product configuration 120. The method 100 may analyze the rule set to determine a proxy part to add to the at least one product configuration 130. The method 100 may provide the proxy part an indicator, wherein the indicator transmits a signal to indicate the proxy part should be removed from the at least one product configuration 140. The method 100 may add the proxy part to the at least one product configuration 150. The method 100 may iteratively compare the product configuration to the rule set until the product configuration meets the rule set 160. Step 160 may further analyze the rule set to determine a different proxy part to add to the at least one product configuration. Step 160 may further provide the different proxy part a different indicator. Step 160 may further add the different proxy part to the at least one product configuration. The method 100 may provide a test associated with the at least one product configuration 170. The method 100 may receive at least one signal from at least one indicator 180. Finally, the method 100 may remove at least one proxy part from the at least one product configuration 190.

One alternate embodiment of method 100 may include adding a step to log test records against the proxy parts that were removed so that the proxy parts may be considered valid for shipment as field spares or the like.

The test disclosed in step 170 may comprise of any test run on the product in order to test the functionality of the product and the components making up the product.

Step 140 discloses an indicator that transmits a signal to indicate that the proxy part should be removed. The signal transmission may comprise a signal transmitted in the visible light spectrum or in the electromagnetic spectrum. However, one skilled in the art may realize that the indicator may comprise alternate embodiments in order to achieve transmitting a signal indicating that a proxy part should be removed from the product configuration.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for determining dynamic test coverage for a product, performed by a processor executing a non-transitory computer usable program code, comprising:
  receiving a customer order, the customer order comprising at least one product configuration;
  receiving a rule set associated with the at least one product configuration;
  analyzing the rule set to determine a proxy part to add to the at least one product configuration;
  providing the proxy part an indicator, wherein the indicator transmits a signal to indicate the proxy part should be removed from the at least one product configuration;
  adding the proxy part to the at least one product configuration;
  iteratively comparing the product configuration to the rule set until the product configuration meets the rule set, further comprising:
    analyzing the rule set to determine a different proxy part to add to the at least one product configuration;
    providing the different proxy part a different indicator;
    adding the different proxy part to the at least one product configuration;
  providing a test associated with the at least one product configuration;
  receiving at least one signal from at least one indicator; and
  removing at least one proxy part from the at least one product configuration.

* * * * *